United States Patent [19]

Smith

[11] 4,371,866

[45] Feb. 1, 1983

[54] REAL-TIME TRANSFORMATION OF INCOHERENT LIGHT IMAGES TO EDGE-ENHANCED DARKFIELD REPRESENTATION FOR CROSS-CORRELATION APPLICATIONS

[75] Inventor: James L. Smith, Grand Prairie, Tex.

[73] Assignee: The United States of America as represented by the Secretary of the Army, Washington, D.C.

[21] Appl. No.: 208,961

[22] Filed: Nov. 21, 1980

[51] Int. Cl.³ .............................................. G06K 9/58
[52] U.S. Cl. .................. 340/146.3 F; 340/146.3 AE; 356/376
[58] Field of Search ......... 350/370, 372, 407, 162 SF, 350/266, 272; 354/110, 120; 356/351, 376, 2; 340/146.3 F, 146.3 P, 146.3 G, 146.3 AE; 358/166, 37, 96, 107; 364/515

[56] References Cited

U.S. PATENT DOCUMENTS

| | | | |
|---|---|---|---|
| 3,016,518 | 1/1962 | Taylor | 340/146.3 MA |
| 3,366,926 | 1/1968 | Silsby et al. | 340/146.3 D |
| 3,882,454 | 5/1975 | Marie et al. | 340/146.3 F |

Primary Examiner—Leo H. Boudreau
Attorney, Agent, or Firm—Nathan Edelberg; Robert P. Gibson; Robert C. Sims

[57] ABSTRACT

Cross-correlation of an image with a reference pattern is done in order to determine recognizable content and gives a sharp correlation peak whenever both image and pattern are edge-enhanced, darkfield representations. Incoherent light, conventional optics and electronics are used to obtain edge-enhanced, darkfield representations which are obtained by sending the light from the object through a dual-aperture unit to a lens so that a recording medium located forward of the focusing plane of the lens will receive light blocked alternately by the regular (perimeter) stop and the central stop and will record the difference.

8 Claims, 9 Drawing Figures

REAL-TIME TRANSFORMATION OF INCOHERENT LIGHT IMAGES TO EDGE-ENHANCED DARKFIELD REPRESENTATION FOR CROSS-CORRELATION APPLICATIONS

DEDICATORY CLAUSE

The invention described herein may be manufactured, used, and licensed by or for the Government for governmental purposes without the payment to me of any royalties thereon.

BACKGROUND AND BEST MODE OF THE INVENTION

A cross-correlation operation for purposes of recognition might consist of the following: An image of interest is focused onto a reference pattern, perhaps a positive photographic transparency. If the image and pattern contain some region which is the same, then they can be rotated and translated with respect to one another until this region is in coincidence for both image and pattern. Generally, the amount of image light passing through the reference pattern is greater for coincidence than non-coincidence. The peak in light transmitted as a function of image-pattern displacement is called the correlation peak. The image light transmitted through the pattern outside the region of coincidence is generally non-zero and fluctuates as a function of displacement; this light contribution will be referred to as optical noise. For recognition purposes it is desirable to reduce this noise as much as possible. Noise is relatively small compared to the correlation peak when the image (pattern) is complex and the total area of bright (transmitting) features is small compared to that of the dark (opaque) regions. An array of bright stars against darkfield space satisfies this condition, but daytime terrain, etc. generally does not. However, the terrain image (pattern) would be appropriate if each feature were replaced by a thin, bright (transmitting) outline and if all solid areas, dark or light, were made black (opaque). It is exactly this change that will be referred to as a transformation to an edge-enhanced, darkfield representation.

Cross-correlation operations are applicable to recognition and identification in character-reading machines, aerial reconnaissance, image-recognition missile guidance, etc. Edge-enhanced, darkfield representations can be obtained by using coherent light, very high quality optics, and spatial filtering techniques. Cross-correlation operations using coherent light can be performed by comparing an appropriately filtered input image with either a reference pattern or a Fourier transform filter made from it which displays spatial frequency content. Where real-time processing is required, the incoherent-light input image must be transferred to a coherent beam by using a suitable real-time device, e.g., a liquid crystal optical modulator which is under development by Hughes.

The disadvantages of an expensive, fragile, and complex coherent optics system in performing cross-correlation operations, particularly with small image-guided missiles, is evident. One alternative to coherent optics image-guidance of a missile is the laser target designator. A laser beam illuminates the target, and the missile, sensing this light, is guided to it. The disadvantages of this approach is that a laser transmitter (a location give-away) is required, and the target must remain illuminated during the missile's entire flight.

A concept based on recognition of targets, characters, terrain, etc., using reference patterns, electronics and incoherent light from the object would certainly have many potentially economical applications. The purpose of this disclosure is to describe systems which are pertinent to such a concept. System Type I obtains an edge-enhanced, darkfield representation of an incoherent-light input image, and System Type II produces a cross-correlation signal for an edge-enhanced, darkfield input image with an edge-enhanced, darkfield reference pattern without the need to actually display the transformed input image.

For applications in aerial reconnaissance and missile guidance where edge-enhanced, darkfield representations of terrain/target configurations are required, this invention can serve to reduce cost and fragility (eliminating on-board coherent optics), reduce likelihood of being discovered (no transmitter used) and, appropriately used in image-recognition missile guidance systems, promote a "fire and forget" capability not possessed by systems depending on continuous laser target designation during missile flight. Applicability to character reading machines, and a host of other optical processing systems is evident.

DESCRIPTION FOR THE BEST MODE AND PREFERRED EMBODIMENTS

General Principles

Figure 1:
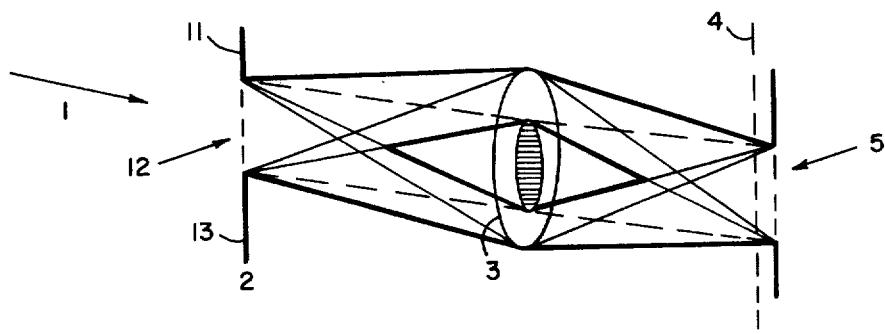
FIG. 1 is a lens-stop configuration for rays passing through central and perimeter regions.
Figure 2:
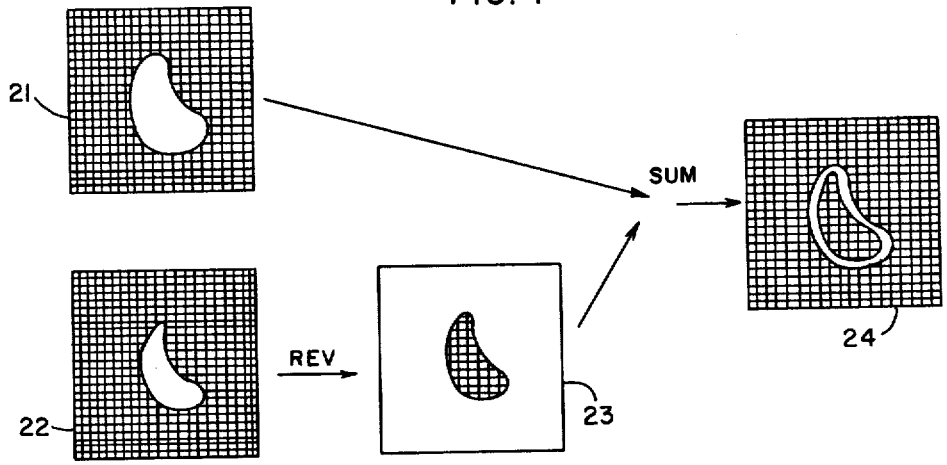
FIG. 2 is a graphic illustration of the operation to obtain an edge enhanced, darkfield representation.

The principle of operation is based on the lens-stop configurations depicted FIG. 1. Diffuse, incoherent light 1 strikes an object 2 which is opaque in the upper 11 and lower 13 parts and transmitting in the central 12 (perforated) part. The object center 12 is focused by lens 3 to appear inverted at 5. The heavy lines define the envelope of all rays which pass through the lens in the outer (unshaded) region of the lens, and the perforated lines define that for rays passing through the central (shaded) region. Aperturing the lens with a stop which blocks off the outer lens region will be called a regular (or perimeter) stop. A stop which blocks off the central region will be called a central stop. If the recording plane 4 is slightly displaced from the focus plane (where the image would be in perfect focus), then the exposure of some recording medium at 4 will cover a smaller area for the perimeter stop on the lens than for the central stop. Thus, for transmitting regions of the lens about equal for either type of stop, the difference in exposure at 4 for the central and perimeter stops will produce a representation of the outline of the bright (transmitting) region of the object. For the configuration shown in FIG. 1, subtracting exposure for the perimeter stop from that for the central stop will give an edge-enhanced, darkfield representation of the object (provided, of course, that the exposure recording medium responds positively, e.g., like positive photograph film). FIG. 2 illustrates the process graphically. The central stop causes a recording 21 which covers more area than that 22 caused by the perimeter stop. In order to subtract the exposure 22 from that at 21, the second exposure 22 is reversed, producing a third 23 which is added to the first 21 to produce the edge-enhanced, darkfield representation 24. The darkfield region of the final result is not as dark as the darkest regions of 21 and 22, but this merely amounts to some "optical dc" which can be removed by contrast increase, etc. If the process illustrated utilizes photographic plates, then four separate plates are used. For real-time applications, photographic film is not a sufficiently fast medium, and other recording media must be used.

Technical Description

The system to be described falls into two categories. The first category (System Type 1) is concerned with producing an edge-enhanced, darkfield representation of some object, and the second category (System Type 2) cross-correlates a non-displayed representation with an edge-enhanced, darkfield reference pattern (which could be produced by System Type 1).

System Type 1

Figure 3:
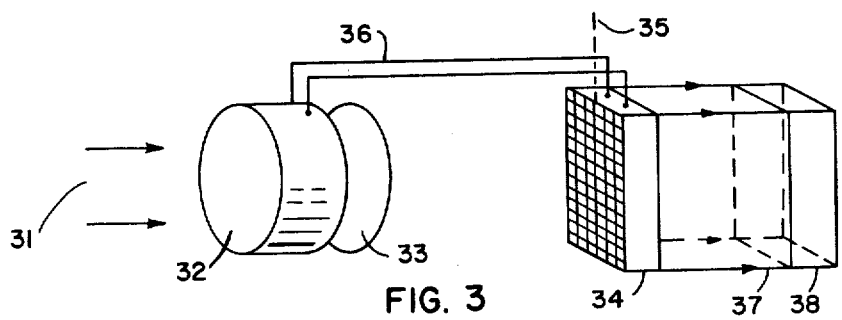
FIG. 3 shows a system to obtain real-time, edge-enhanced, darkfield representation.

FIG. 3 shows that incident light 31 from an object passes through a dual-aperture unit 32 to the imaging lens 33. The dual-aperture unit produces, alternately, the regular (perimeter) stop and the central stop. It is close to, and serves as aperture for, the imaging lens. The image recording plane 35 is slightly displaced from the true focus plane for the image and contains the recording device 34. This device may simply be a photographic plate, but for real-time operation it will function as a detection-processing array, each unit of which contains electronics that produces a signal proportional to the edge-enhanced, darkfield representation of the object at its location. The recording device requires synchronizing signals from the dual-aperture unit which pass along lines 36. The recording device outputs pass through an interface 37 and into an image display 38. The electronics of each unit in the recording device 34 is the same as that of the single unit of FIG. 5 to be described in System Type 2.

Figure 6:
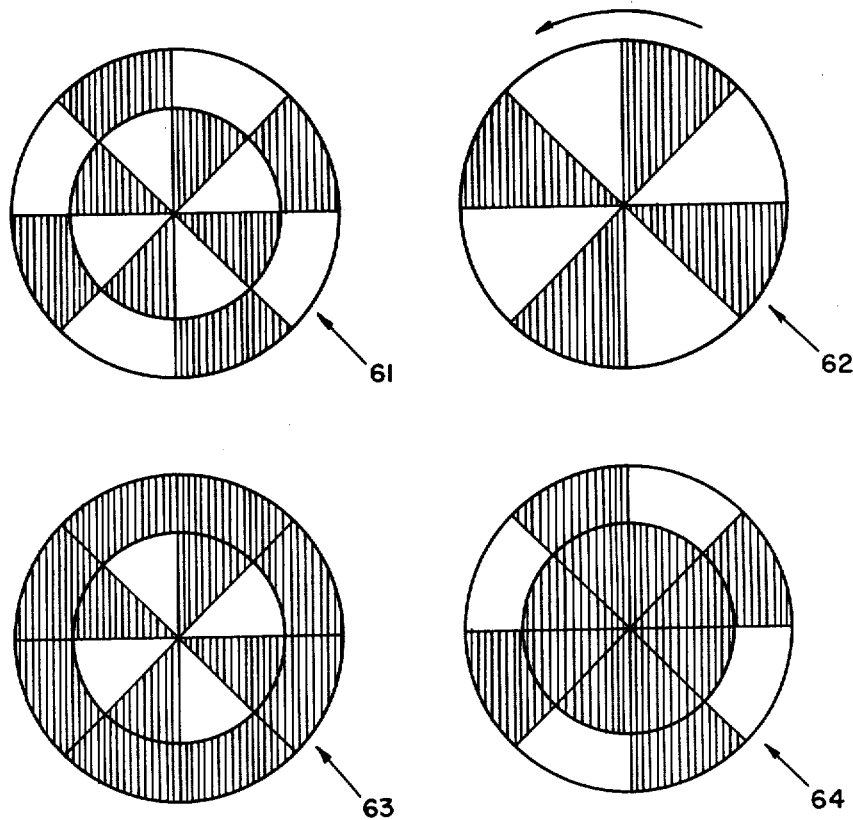
FIG. 6 shows a first embodiment for dual-aperture operation.

There are several options for the dual-aperture 32 design of FIG. 3: The first option is shown in FIG. 6. Patterns are transmitting (white) in some portions and opaque (shaded) in others. Pattern 62 is superimposed on 61 and turns, generating alternately net transmission patterns 63 and 64.

Figure 7:
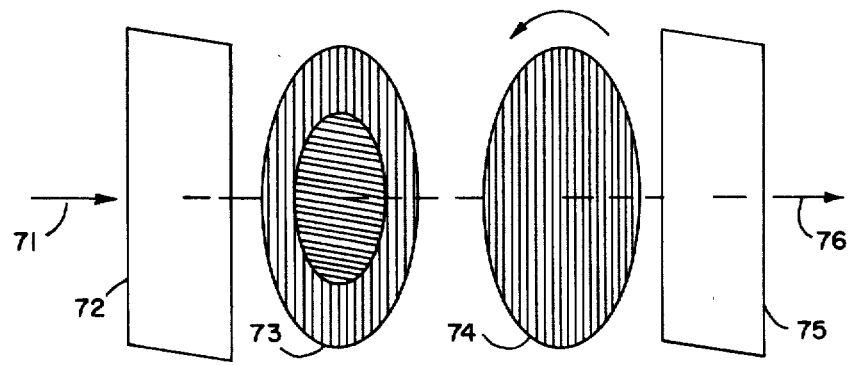
FIG. 7 shows a second embodiment for dual-aperture operation.

FIG. 7 depicts light 71 passing through a depolarizing sheet 72; a polarizer 73 with horizontal and vertical polarization for the central and outer regions, respectively; a turning polarizer wheel 74; and another depolarizing sheet 75.

Figure 8:
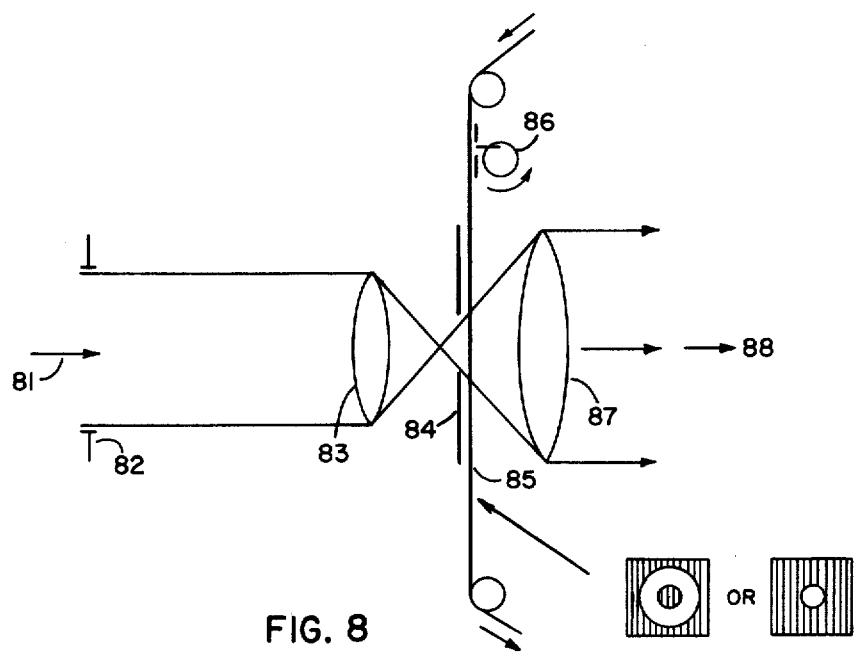
FIG. 8 shows a third embodiment for dual-aperture operation.

FIG. 8 illustrates a third option. Light 81 passes through a fixed aperture 82 and a lens 83, focusing the aperture image 84 on a film loop 85. The film has alternately the perimeter and central stop patterns and advances due to the advance claw 86 one frame at a time. The transmitted light is then corrected for the convergence caused by lens 83 by another lens 87 and passes on toward the imaging lens 88.

Figure 9:
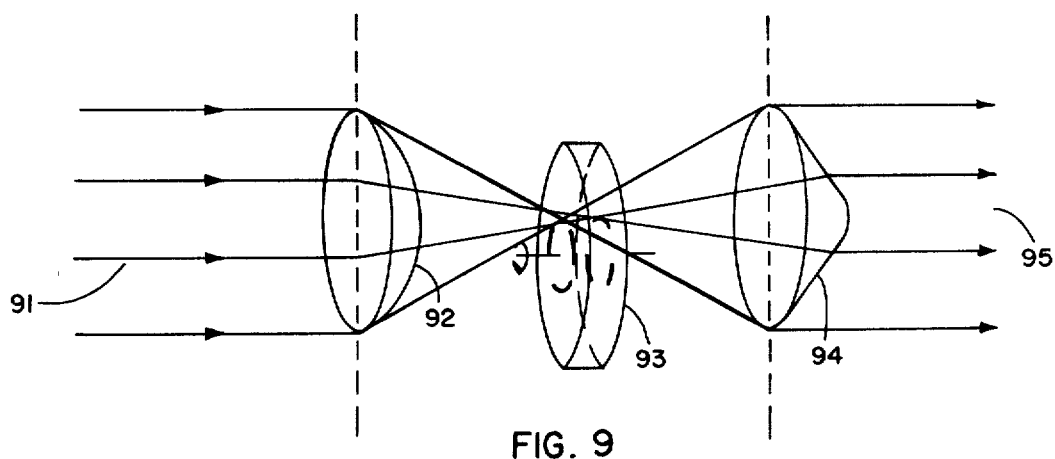
FIG. 9 shows a fourth embodiment dual-aperture operation.

Another arrangement is appropriate for the special case of a distant object which occupies such a small region directly in front of the disclosed system that the incoming rays are paraxial. FIG. 9 depicts light 91 from the object which passes through a lens 92 with significant spherical aberration. Rays passing through the outer region of 92 are brought to a focal point near the front surface of a transparent wheel 93 and central rays are brought to a focal point near the opposite surface. The two surfaces contain a discontinuous circular ring opacity of such a radius and phase that, when the wheel turns, the transmitted light alternately corresponds to the central and outer regions of the lens 92. The rays of transmitted light are corrected for both the convergence and spherical aberration of lens 92 by an aspherical lens 94 and pass on toward the imaging lens 95.

System Type 2

Figure 4:
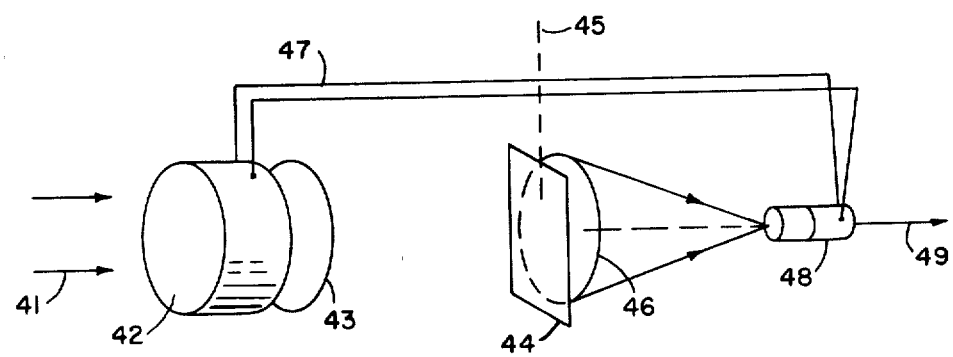
FIG. 4 is a system showing cross-correlation between an edge-enhanced, darkfield representation of an input image and a reference pattern.

FIG. 4 shows that light from the object 41 passes through the dual-aperture unit 42, the image lens 43, the edge-enhanced, darkfield reference pattern 44 which is in the image plane 45, then through a converging lens 46 to a detector and stop-synchronized electronic-difference module 48. This module is synchronized with 42 through lines 47. The module output voltage 49 is a cross-correlation signal.

Figure 5:
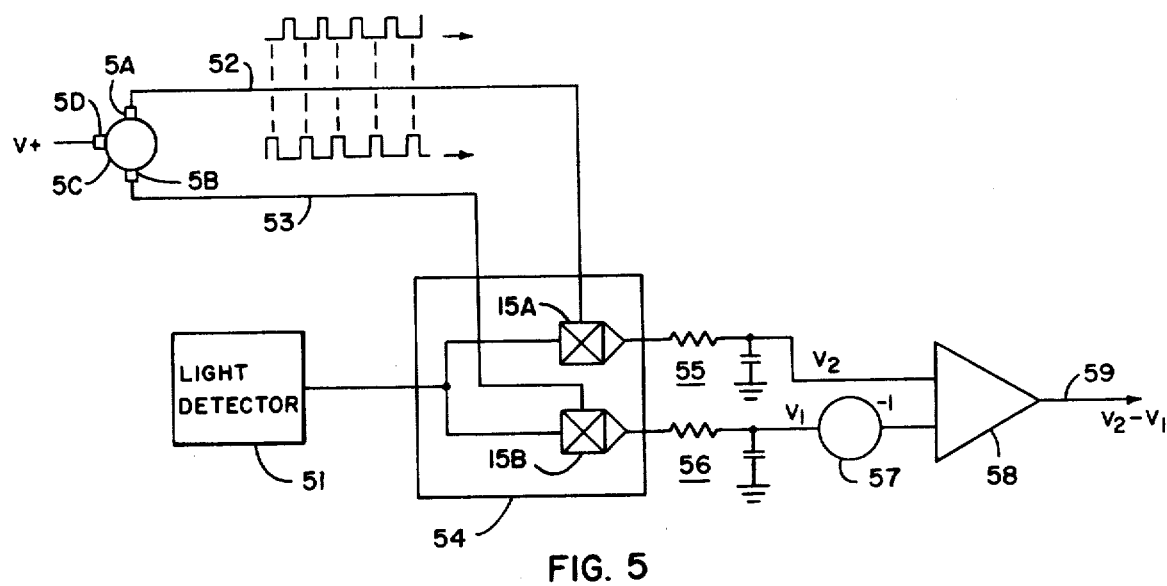
FIG. 5 is a schematic illustration of a detector and stop-synchronized, electronic-difference module.

FIG. 5 (described later) shows a symbolic schematic for the module 48.

The options for the dual-aperture design are the same as those for System Type 1.

Operation

System Type 1

FIG. 3 shows incident light 31 from an incoherently illuminated (e.g. daylight) object. The light passes through the dual-aperture unit 32 to the imaging lens 33. The function of the dual-aperture unit is to place alternately a regular (perimeter) stop and a central stop just in front of the imaging lens, and to emit voltage signals into 36 which are indicative of which stop is in place at the time. The lens 33 forms an image on the image plane 35 in which the spatial recording device 34 is positioned. The image plane is slightly displaced (toward the lens, for simplicity in discussion) from the focus plane of the object. Each cell of the recording device electronically subtracts the light exposure it receives with the perimeter stop over the lens from that for the central stop over the lens. The signals from 36 are used to synchronize the stop position with the electronic operation. The electronics of each cell are the same as for the single cell to be discussed below for FIGS. 4 and 5. The difference signals from each cell of the recording device 34 are passed through an interface 37 and into the image display 38. The edge-enhanced, darkfield representation of the object is seen at this point. It can be photographed as a transparency and used as a reference pattern in System Type 2.

System Type 2

In FIG. 4, incoherent light from the object 41 again passes through the dual-aperture unit 42, imaging lens 43 and falls on the image plane 45, which is slightly displaced (forward) from the true focus plane. Instead of a recording device, the image plane consists of an edge-enhanced, darkfield reference pattern 44 in contact with a converging lens 46 which integrates the light transmission and directs it to a single cell 48. This light responsive cell is a detector and stop-synchronized, electronic-difference module. Stop-position synchronization signals from 47 enable the module to subtract the light exposure for the perimeter stop on the imaging lens from that for the central stop on the lens. This difference signal 49 is a voltage which represents the cross-correlation of an edge-enhanced, darkfield image of the object with the edge-enhanced, darkfield reference pattern 44.

FIG. 5 represents the detector and stop-synchronized electronic-difference module which is the same type light responsive cell of which the array comprising the recording unit 48 in FIG. 4 and 34 in FIG. 3 is made. Light is received at 51 by the detector (e.g., Si, Se, pyrolectric or CdS detector). The detector signal is conducted to the synchronizer block 54 into which stop-position signals 52 and 53 are introduced. For the period of transition between the stops, no voltage exists on 52 or 53. For a stop in place, however, a rectangular voltage waveform is produced for its duration. The on-voltage and off-voltage segmenst on 52 and 53 are 180° out-of-phase. The block 54 consists of two multipliers 5A and 5B utilizing the inputs from 51,52 and 53 such that one multiplier transmits the signal from 51 when one stop is in place and the other transmits the signal from 51 when the other stop is in place. For the larger signal $V_2$, the output passes through the filter 55 to one input terminal of a summer 58. The lesser signal is passed through another filter 56, through a voltage inverter 57, and to another input terminal of 58. The summer 58 produces the voltage difference $V_2-V_1$ for analysis at 59. This difference is the desired cross-correlation signal.

Dual-Aperture Operation

In all the several options for the dual-aperture design, a voltage source is supplied to produce the rectangular pulses along 52 or 53 as depicted in FIG. 5. This voltage is interrupted and switched via brushes 5A and 5B, voltage supply V with brush 5D, and a rotor 5C with contacts positioned to complete the circuit alternately along 52 and 53. The contact positions and rotor velocity are synchronized with the stop attenuation. The operations suggested by FIGS. 6, 7 and 9 may entail a rotor situated on the axis or geared to the rim of a rotating component. In FIG. 8, it may be connected to the rotation of the advance claw unit 86.

The first option is depicted in FIG. 6 in the form of disks 61 and 62. The transmission reticle patterns 61 and 62 are superimposed so that when 62 rotates, the net effect alternate between that of 63 and 64. Hence light transmission through the image lens is effectively that due to a perimeter stop which is followed by that of a central stop and so on.

FIG. 7 shows the second option which utilizes a depolarizing plastic sheet 72, a polarizing sheet 73 whose central and perimeter polar directions are 90° apart, another polarizing sheet 74 and then another depolarizing sheet 75. The non-transmitting region for light going from 71 to 76 comprises a stop which cycles between the central and perimeter regions.

A film loop, the frames of which alternate between the perimeter and central stop patterns, is used in the option shown in FIG. 8. Object light 81 passes through a fixed aperture 82 which is imaged by the lens 83 onto a film loop plane 84. The stop pattern is then impressed on the light beam which is corrected for the convergence due to 83 by another lens 87 and subsequently passes on toward the image lens 88. The film frames are changed by the advance claw 86.

FIG. 9 illustrates the dual-aperture unit for the case of paraxial rays 91 from a distant object. This is, of course, appropriate for the special case where the object of interest constitutes a narrow field-of-view. Light is converged by a lens 92 which exhibits significant aberration. Rays from the perimeter region of 92 fall on the front surface of a rotating, transparent plate 93 which contains a discontinuous, opaque circle of such a radius and line-width that perimeter rays are alternately blocked and transmitted. Rays from the central region of 92 fall on the second surface of 93 with a similar discontinuous opacity designed to transmit when the first surface blocks and vice versa. The aspherical lens 94 gathers the transmitted rays, corrects for the convergence and spherical aberration of 92, and passes the light toward the imaging lens 95. Thus FIG. 9 represents an alternating central and perimeter stop operation.

I claim:

1. A system for providing an edge-enhanced representation of an object comprising a lens means having a focus plane; a recording means located between the focus plane and said lens means so as to receive light reflected from the object and focused through said lens means; a dual-aperture means located between the light from said object and said lens means so as to alternately aperture the lens with a perimeter stop which blocks off the outer lens region and with a central stop which blocks off the central region of said lens means; and said recording means combining the image received from said perimeter stop with an image received from said central stop as to produce an edge-enhanced representation of the object.

2. A system as set forth in claim 1 wherein said recording means substracts the image received from the perimeter stop from that received from the central stop so as to produce a darkfield representation.

3. A system as set forth in claim 2 wherein said recording means is a detection-processing array of units; each unit producing a signal proportional to the difference between light received from said central stop and said perimeter stop.

4. A system as set forth in claim 3 further providing an image display means connected to the array of units so as to display an edge-enhanced representation of the object.

5. A system set forth in claim 2 wherein said dual-aperture means consist of two dishes having reticle patterns such that when one disk rotates relative to the other, light from the object will alternately pass through the perimeter stop and the central stop of the lens.

6. A system as set forth in claim 2 wherein said dual-aperture means comprises first and second depolarizing means positioned between said object and said lens; a first disk means having a polarized medium located in its center which constitutes the stop for light passing through the center of said lens; said disk means having an outer polarized medium polarized 90° with respect to said center; said outer medium constituting the perimeter stop of said lens; a second disk means having a single polarized medium; said first and second disk means being located between said two depolarizing means; and said second disk means being mounted for rotation relative to said first disk means so as to alternately provide light through said lens means through said perimeter stop and said central stop.

7. A system as set forth in claim 1 or 2 wherein said dual-aperture means comprises a second lens; a film loop located between said second lens and said first lens; said film loop having alternate frames which allow light to pass through said outer region or said central region of said lens; and means for moving said film loop.

8. A system as set forth in claim 1 wherein said object is located at a distance of such length that the reflected light from it will be in the form of paraxial rays; a second lens having a significant spherical aberration located to converge the rays from said object; a rotating transparent plate which contains a discontinuous opaque circle on the first surface of such a radius and line-width that perimeter rays are alternately blocked and transmitted; rays from the central region of said second lens fall on a second surface of said rotating, transparent plate with a discontinuous opaque circle of opposite phase to that on the first surface such that alternate transmission and blocking of the rays is obtained; and a third lens being located to receive said rays and is aspherical so as to correct for the converging and spherical aberration of the second lens.

* * * * *